(12) United States Patent
Gerber

(10) Patent No.: US 6,887,019 B1
(45) Date of Patent: May 3, 2005

(54) DEVICE FOR THERMALLY SHRINKING TOOLS

(75) Inventor: Ernst Gerber, Reigoldswil (CH)

(73) Assignee: Rego-Fix AG, (CH)

( * ) Notice: Subject to any disclaimer, the term of this patent is extended or adjusted under 35 U.S.C. 154(b) by 34 days.

(21) Appl. No.: 10/088,070

(22) PCT Filed: Sep. 18, 2000

(86) PCT No.: PCT/CH00/00501
§ 371 (c)(1),
(2), (4) Date: Mar. 8, 2002

(87) PCT Pub. No.: WO01/19558
PCT Pub. Date: Mar. 22, 2001

(30) Foreign Application Priority Data
Sep. 16, 1999 (CH) .................................. 1699/99

(51) Int. Cl.[7] ...................... B23C 5/00; B23B 31/117; B23P 11/02
(52) U.S. Cl. ................. 409/234; 408/239 A; 29/447; 279/102
(58) Field of Search .................. 409/234, 232; 408/239 R, 239 A, 238; 279/102; 29/447; 403/28–30, 403/273

(56) References Cited

U.S. PATENT DOCUMENTS

| | | | |
|---|---|---|---|
| 4,516,787 A * | 5/1985 | Venable | ................ 279/2.02 |
| 4,759,110 A | 7/1988 | Rieger | |
| 5,267,384 A * | 12/1993 | Teeslink | .................. 29/447 |
| 5,277,435 A * | 1/1994 | Kramer et al. | ................ 29/447 |
| 5,311,654 A * | 5/1994 | Cook | .......................... 29/447 |
| 6,260,858 B1 * | 7/2001 | DeLucia | ...................... 409/234 |
| 6,394,466 B1 * | 5/2002 | Matsumoto et al. | ......... 409/234 |
| 6,519,829 B1 * | 2/2003 | Kuhlmann et al. | ............ 29/447 |
| 6,595,528 B2 * | 7/2003 | Voss | ............................... 279/102 |
| 2003/0132582 A1 * | 7/2003 | Haimer | ..................... 279/102 |

FOREIGN PATENT DOCUMENTS

| | | |
|---|---|---|
| DE | 19638808 | 3/1998 |
| EP | 1029620 A2 * | 8/2000 |
| JP | 61-142024 | 6/1986 |
| JP | 61-219534 | 9/1986 |
| JP | 2-41807 A * | 2/1990 |
| JP | 09-253839 | 9/1997 |

OTHER PUBLICATIONS

ASM Handbook, vol. 20, Materials Selection and Design, 1997, p. 279.*

* cited by examiner

Primary Examiner—Erica Cadugan
(74) Attorney, Agent, or Firm—Hoffmann & Baron, LLP

(57) ABSTRACT

A heat shrink tool holder for holding tools and machine parts in an axial bore comprises a sleeve between the bore of the holder and the tool shank or machine part. The sleeve is a reducing sleeve that transfers a holding action exerted by the holder in its cold state to the tool shank or part. The sleeve is made of a material with a low thermal conductivity, like ceramic, and may be interchangeable or firmly fixed to the holder.

6 Claims, 1 Drawing Sheet

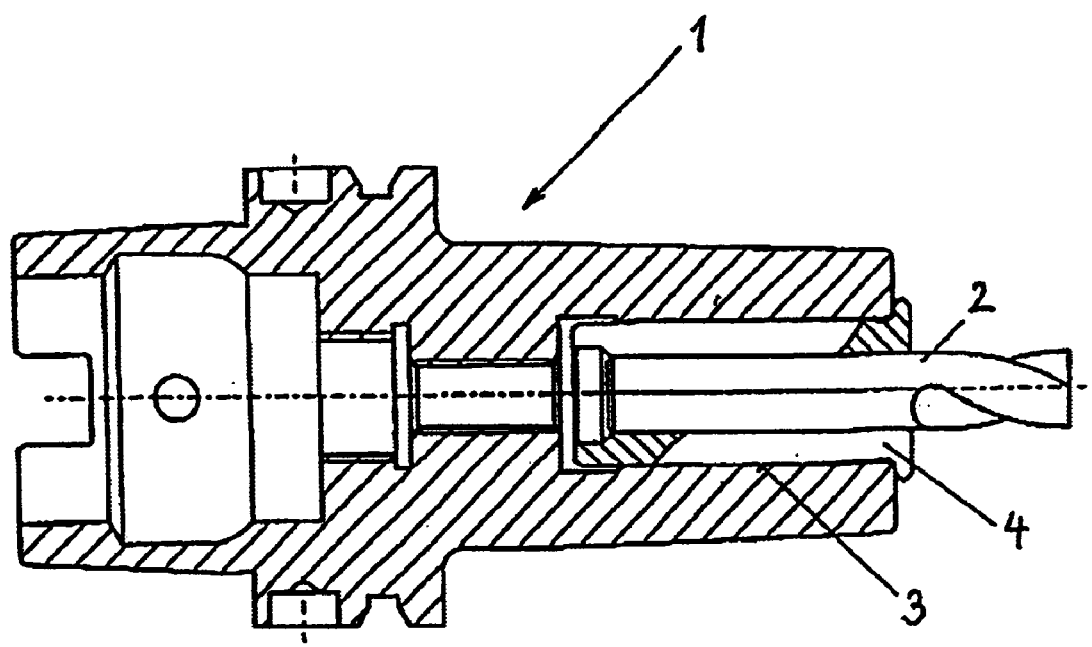

DEVICE FOR THERMALLY SHRINKING TOOLS

The invention relates to a device for thermally shrinking and expanding tools and other machine parts in a holder.

It is known in the metalworking and woodworking industry thermally to shrink tools in a holder. This is done by heating the holder and then inserting the tool shank. On cooling, the holder closes around the shank to create a firm, high-precision tool-holding device.

To enable the shank to be removed (tool expansion), the holder must be made of a material which has a larger thermal expansion than the shank. For a shank made of hard metal with a coefficient of thermal expansion of $6.10^{-6}$, an example of a suitable holder is one made of steel, which has twice the thermal expansion. A steel shank would in turn require a holder made of an aluminium alloy with a coefficient of thermal expansion twice that of steel.

If the holder and the shank to be shrunk are made of materials with the same or approximately the same thermal expansion, it is still possible to shrink the shank because only the holder is heated in the shrinking process, the shank being cold. Tool expansion is normally no longer possible because, when the holder is heated, the good thermal conductivity of metals is such that the shrunk shank heats up and expands together with said holder.

Even for shrinking, the shank has to be introduced quickly because the heat transfers very rapidly from the holder to the shank due to the good thermal conductance of metals.

The smaller the bore of the holder, the smaller is the thermal expansion on heating and the more exacting ae the work tolerances. For example, if the thermal expansion is 0.048 mm for a bore diameter of 20 mm, then for the same material it is only 0.0072 mm for a bore diameter of 3 mm.

The object of the invention is to avoid these disadvantages associated with thermal shrinking.

This is achieved according to the invention by means of a sleeve inserted in the bore of the holder, said sleeve preferably being made of a material with a low thermal conductivity.

A preferred embodiment of the invention will be described below with the aid of the attached drawing.

The drawing is a sectional diagram of a tool holder 1 with an inserted tool 2, which in this case is a twist drill. The width of the bore 3 of the holder is approximately twice the diameter of the drill shank. A sleeve 4 is located between the drill 2 and the holder. The sleeve is provided with slits cut in from one end, or alternately from both ends, to assure a degree of elasticity. However, the slits can also be omitted, depending on the material and the wall thickness.

As stated, the material of the alcove 4 probably has a low thermal conductivity so that the heat transfer from the heated holder to the tool is substantially delayed.

If the sleeve material does not have an especially low thermal conductivity, tool shrinking and expansion are facilitated by the grater thermal expansion due to the larger diameter of the holder, the only condition being that heating takes place rapidly, as in the case of inductive heating.

Apart from a low thermal conductivity, however, the material must also have a sufficiently high strength, toughness and hardness to cope with the stresses applied. Certain ceramic materials, e.g. zirconium oxide ceramic, offer this combination of properties.

The sleeve can be inserted in the tool holder in a variety of ways. It can either be inserted in the holder as an interchangeable reducing sleeve or fixed firmly to the holder, e.g. by press-fitting, adhesion, screwing, etc.

The advantages of interchangeable sleeves are as follows. With a holder of specific bore diameter, the insertion of interchangeable reducing sleeves makes it possible to clamp tools with different shank diameters.

When the holder is heated, the greater thermal expansion of the bore of the holder is transferred linearly through the reducing sleeve to its smaller bore. In this way, tool shanks made of a material with the same coefficient of thermal expansion as the holder can be shrunk and also expanded again.

Another advance is that the small bore diameters of the reducing sleeve do not have to be manufactured with such extremely small work tolerances.

If overstressing causes the tool shank to rotate in the housing, at worst the reducing sleeve, and not the holder, will be damaged.

What is claimed is:

1. Heat shrink tool holder for being inserted into a machine spindle and for holding a tool shank or machine part, the heat shrink tool holder comprising a body having an axial bore, and a sleeve fitting in the axial bore of the body, the sleeve having a second bore to fit onto and contact the tool shank or part, the second bore being generally cylindrical, wherein the sleeve is a reducing sleeve that transfers a holding action exerted by the body in its cold state to the tool shank or part, wherein the body has a greater coefficient of thermal expansion than the sleeve.

2. Device according to claim 1, characterized in that the sleeve is made of ceramic.

3. Device according to claim 1, characterized in that the sleeve takes the form of an interchangeable reducing sleeve.

4. Device according to claim 1, characterized in that the sleeve is fixed to the holder.

5. Device according to claim 1, characterized in that the body has the same coefficient of thermal expansion as the tool shank or part.

6. Device according to claim 1, characterized in that the axial bore of the body is generally cylindrical.

* * * * *